United States Patent Office 3,840,578
Patented Oct. 8, 1974

3,840,578
PROCESS FOR THE PREPARATION OF NON-YELLOWING DIISOCYANATO-DIPHENYL-METHANE
Hans Joachim Hennig, Leverkusen, Germany, assignor to Bayer Aktiengesellschaft, Leverkusen, Germany
No Drawing. Filed Feb. 9, 1973, Ser. No. 330,907
Claims priority, application Germany, Mar. 4, 1972, P 22 10 607.6
Int. Cl. C07c 119/04
U.S. Cl. 260—453 SP
8 Claims

ABSTRACT OF THE DISCLOSURE

This invention discloses a new method for reducing the hydrolyzable chlorine content in diisocyanato-diphenylmethane by the addition of a metal chloride in a glycol carbonate solvent. The use of a glycol carbonate solvent in this process is new and has the advantage of simplifying the process as well as reducing the amount of metal chloride that must be used.

One feature of the production of polyurethane resins by the isocyanate polyaddition process which is undesirable because it reduces the quality of the product is the property of unpurified commercial 2,2'-, 2,4'- and 4,4'-diisocyanato diphenylmethane to undergo yellowing under the influence of light, oxygen and moisture. Numerous processes for the purification of these polyisocyanates as well as for stabilizing them against yellowing are already known, such as their treatment with phosphites, phenols, thioureas, amines, ethylene imines, carbonates, sulphonyl isocyanates, phenothiazine, o-benzosulphimide, 1-p-toluene sulphonyl-3-phenyl urea, chloroacetamide, etc. Since there is a connection between the amount of hydrolyzable chlorine present and the tendency to yellowing, those measures which primarily have the effect of reducing the chlorine content are particularly effective, for example the treatment of diisocyanato-diphenylmethane with metallic copper, silver, nickel, iron or zinc in accordance with U.S. Pat. No. 3,458,558 or with metal chlorides such as iron (III) chloride, iron (II) chloride, tin (IV) chloride, bismuth (III) chloride, zinc chloride, cadmium chloride or aluminium chloride in accordance with U.S. Pat. No. 3,155,699.

One disadvantage of these methods is the limited solubility, if not complete insolubility, of the last mentioned additives in diisocyanato-diphenylmethane, which usually necessitates the use of excessively large quantities of these metals and metal chlorides and complicated methods of dividing them very finely in the isocyanate. In the case of iron (III) chloride, which is a very effective substance for this purpose, the quantity in which it can be used in the coupled production of monomeric and polymeric diisocyanato-diphenylmethanes is limited because the iron content in polymeric diisocyanato-diphenylmethane must be kept as low as possible on account of the catalytic effect of the iron ions on urethanization reactions.

According to the invention, the difficulties described above are overcome by using a special solvent for the said metal chlorides, which solvent is distinguished not only by its excellent dissolving power but also by its reactivity with those "acid" impurities of diisocyanato-diphenylmethane which are measured by the hydrolyzable chlorine content.

This invention therefore relates to a process for the preparation of non-yellowing diisocyanato-diphenylmethane by treating impure commercial diisocyanato-diphenylmethane with metal chloride of the general formula:

$$MeCl_n$$

in which

Me represents a divalent iron, zinc or cadmium cation, a trivalent aluminium, bismuth or iron cation or a tetravalent tin cation and
$n$ represents an integer of from 2–4 according to the valency of the metal cation, characterized in that the treatment is carried out with solutions of the metal chlorides in a glycol carbonate.

Any suitable glycol carbonate in which the metal chloride is soluble may be used. It is most preferred to use ethylene glycol carbonate.

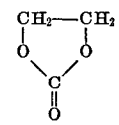

However, 1,2- and 1,3- propylene glycol carbonate as well as 1,2,- 1,3,- and 1,4-butylene glycol carbonate can also be used.

Glycol carbonates are distinguished by excellent dissolving power for the above mentioned metal chlorides, in particular for iron (III) chloride, and therefore provide the possibility of an easy commercial method of dosing the additive, for example with pumps. According to the invention glyol carbonates may be used in combination with any of the above mentioned metal chlorides but it is preferred to use a solution of iron (III) chloride in glycol carbonate for the process of the invention. The combination of iron (III) chloride and glycol carbonate has a synergistic effect as regards its efficiency as a means for reducing the hydrolyzable chlorine content and improving the resistance of diisocyanatodiphenylmethane to yellowing.

The treatment of diisocyanato-diphenylmethane with metal chlorides dissolved in glycol carbonate may be carried out in any way desired at temperatures of between 50 and 250° C.; the metal chloride can be very finely dispersed and therefore distributed in the most effective manner so that a smaller quantity may be used compared with the amount of iron (III) chloride which would be required in the undissolved state.

The solutions used in the process according to the invention are preferably 10–70% solutions of the metal chlorides in glycol carbonate used in a concentration of 0.005 to 3% by weight of metal chloride, preferably 0.001 to 0.1% by weight of metal chloride, based on the quantity of polyisocyanate which is required to be stabilized. The process according to the invention may be carried out by mixing commercial diisocyanatodiphenylmethane, which consists mainly of 2,2'-, 2,4'- and 4,4'-isomers, with the solution of metal chloride in glycol carbonate and heating the mixture to temperatures of about 50 to 250° C., preferably 150 to 200° C., for a period which may range from a few minutes to several hours. The diisocyanato-diphenylmethane may then be obtained in a pure form in which it is resistant to yellowing, for example by subsequent distillation.

The invention is further illustrated but is not intended to be limited by the following examples in which all parts and percentages are by weight unless otherwise specified.

EXAMPLE 4,4'-diisocyanato-diphenylmethane which had a hydrolyzable chlorine content of .008% and had an exceptionally strong tendency to severe yellowing, was heated to 180° C. with the additives indicated in the table for 60 minutes and then distilled. The material was then analyzed after 3 months' storage in the dark.

| Expt. No. | Additive (percent by weight) | | Hydrolyzable chlorine content in percent | Color index (Gardner) | Color according to subjective observation |
|---|---|---|---|---|---|
| | FeCl₃ | Glycol carbonate | | | |
| 1 | | | 0.006 | 9 | Yellow. |
| 2 | 0.010 | | 0.003 | 9 | Deep yellow. |
| 3 | 0.025 | | 0.003 | 6 | Pale yellow. |
| 4 | | 0.5 | 0.003 | 5 | Pale orange yellow. |
| 5 | 0.025 | 0.1 | 0.001 | 1 | White. |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for reducing the hydrolyzable chloride content of diisocyanato-diphenylmethane which contains hydrolyzable chloride and improving the resistance of said diisocyanato-diphenylmethane to yellowing which comprises mixing sufficient glycol carbonate having dissolved therein 10 to 70% by weight of a metal chloride having the formula:

$$MeCl_n$$

in which
Me represents a divalent iron, zinc or cadmium cation, a trivalent aluminium, bismuth or iron cation or a tetravalent tin cation and
n represents an integer of from 2–4 according to the valency of the metal cation, to incorporate from about 0.005 to about 3% by weight of said metal chloride in said diisocyanato-diphenylmethane and heating the resulting mixture at the temperature of about 50 to about 250° C. to reduce the hydrolyzable chloride content and improve the resistance of said diisocyanato-diphenylmethane to yellowing.

2. The process of claim 1 wherein said metal chloride is present in said diisocyanato-diphenylmethane in an amount of from about 0.01 to about 0.1% by weight.

3. The process of Claim 1 wherein said diisocyanato-diphenylmethane consists of the 2,2', 2,4', and 4,4'-isomers.

4. The process of Claim 1 wherein said mixture is heated to a temperature of about 150 to about 200° C.

5. The process of Claim 1 wherein said diisocyanato-diphenylmethane is subsequently distilled from said mixture.

6. The process of Claim 1 wherein said mixture is heated for a period of a few minutes to several hours.

7. The process of Claim 1 wherein said glycol carbonate is ethylene glycol carbonate, 1,2-propylene glycol carbonate 1,3-propylene glycol carbonate, 1,2-butylene glycol carbonate, 1,3-butylene glycol carbonate or 1,4-butylene glycol carbonate.

8. A process for reducing the hydrolyzable chloride content of 4,4'-diisocyanato-diphenylmethane and improving the resistance of said 4,4'-diisocyanato-diphenylmethane to yellowing which comprises mixing glycol carbonate having dissolved therein from about 10 to about 70% by weight of FeCl₃ in an amount sufficient to give a concentration of from about 0.005 to about 3% by weight of said FeCl₃ based on the weight of said 4,4'-diisocyanato-diphenylmethane and heating said mixture to a temperature of about 50 to about 250° C. for a period sufficient to reduce the hydrolyzable chloride content of said 4,4'-diisocyanato-diphenylmethane and improve its resistance to yellowing and subsequently distilling said 4,4'-diisocyanato-diphenylmethane from said mixture.

References Cited
UNITED STATES PATENTS

| | | | |
|---|---|---|---|
| 3,155,699 | 11/1964 | Powers | 260—453 |
| 2,885,423 | 5/1959 | Spiegler | 260—453 |

LEWIS GOTTS, Primary Examiner

D. H. TORRENCE, Assistant Examiner

U.S. Cl. X.R.

260—45.75 R, 45.75 K